United States Patent
Nogami et al.

[11] Patent Number: 6,077,626
[45] Date of Patent: Jun. 20, 2000

[54] ALKALINE STORAGE BATTERY AND METHOD FOR CHARGING BATTERY

[75] Inventors: Mitsuzou Nogami, Takatsuki; Mutsumi Yano, Hirakata; Mitsunori Tokuda, Osaka; Syuichi Suzuki, Hirakata; Shin Fujitani, Hirakata; Reizo Maeda, Hirakata; Ikuo Yonezu, Hirakata; Koji Nishio, Hirakata, all of Japan

[73] Assignee: Sanyo Electric Co., Ltd., Osaka, Japan

[21] Appl. No.: 09/284,860

[22] PCT Filed: Dec. 22, 1997

[86] PCT No.: PCT/JP97/04774

§ 371 Date: Apr. 22, 1999

§ 102(e) Date: Apr. 22, 1999

[87] PCT Pub. No.: WO98/31063

PCT Pub. Date: Jul. 16, 1998

[30] Foreign Application Priority Data

Jan. 9, 1997 [JP] Japan ................................. 9-001796

[51] Int. Cl.[7] ......................... H01M 10/24; H01M 4/32
[52] U.S. Cl. .................... 429/223; 429/224; 429/218.1; 429/209; 429/165; 423/594; 423/599
[58] Field of Search ....................... 429/223, 224, 429/218.1, 209, 206, 165; 423/594, 599, 140

[56] References Cited

U.S. PATENT DOCUMENTS

| | | | |
|---|---|---|---|
| 5,071,722 | 12/1991 | Yoshimura | 429/217 |
| 5,077,151 | 12/1991 | Yasuda et al. | 429/206 |
| 5,567,549 | 10/1996 | Ovshinsky et al. | 429/223 |
| 5,569,562 | 10/1996 | Glemser et al. | 429/223 |
| 5,569,563 | 10/1996 | Ovshinsky et al. | 429/223 |
| 5,670,271 | 9/1997 | Axmann | 429/59 |
| 5,700,596 | 12/1997 | Ikoma et al. | 429/206 |
| 5,905,003 | 5/1999 | Young et al. | 429/223 |

*Primary Examiner*—Maria Nuzzolillo
*Assistant Examiner*—Raymond Alejandro
*Attorney, Agent, or Firm*—Armstrong, Westerman, Hattori, McLeland & Naughton

[57] ABSTRACT

In an alkali storage battery comprising a positive electrode, a negative electrode and an alkali electrolyte in a battery can, α-nickel hydroxide containing manganese is used as a cathode active material for the positive electrode, and the difference between a charging potential and an oxygen gas evolution potential at the positive electrode is increased, to suppress oxygen gas evolution during the charging, and the volume percentage of the cathode active material and an anode active material is set to not less than 75% in the battery can, to obtain a large battery capacity.

14 Claims, 2 Drawing Sheets

ALKALINE STORAGE BATTERY AND METHOD FOR CHARGING BATTERY

TECHNICAL FIELD

The present invention relates to an alkali storage battery such as a nickel-zinc storage battery, a nickel-cadmium storage battery, or a nickel-metal hydride storage battery using nickel hydroxide for its positive electrode and a method of charging, and more particularly, to an alkali storage battery, whose energy density can be increased by suppressing oxygen gas evolution during the charging and a method of charging.

BACKGROUND ART

Conventionally in an alkali storage battery such as a nickel-zinc storage battery, a nickel-cadmium storage battery, or a nickel-metal hydride storage battery, nickel hydroxide has been generally used as a cathode active material for its positive electrode.

In the case of the alkali storage battery thus using nickel hydroxide as a cathode active material for its positive electrode, electrochemical reversibility is very superior. However, oxygen gas is easily generated from the positive electrode during the charging. Consequently, this oxygen gas evolution makes it difficult for batteries to charge.

In addition, the pressure rises in the battery by oxygen gas evolution, so that an electrolyte solution (hereinafter referred to as an electrolyte) leaks from the battery, and charge/discharge cycle performance is degraded.

In the above-mentioned alkali storage battery, various methods have been conventionally considered. For example, a void inside the battery has been enlarged in order to prevent the pressure in the battery from rising by oxygen gas evolution, and the area of its negative electrode has been increased in order to absorb oxygen gas at the negative electrode.

In such a case, however, there are some problems. For example, the energy density of the alkali storage battery is decreased. Therefore, a battery capacity cannot be obtained sufficiently.

On the other hand, when manganese dioxide electrode is used for a positive electrode of an alkali manganese battery, it is possible to suppress the oxygen gas evolution during the charging. However, the reversibility of manganese dioxide electrode is very poor.

There have been conventionally various developments in order to improve characteristics in an alkali storage battery using nickel hydroxide as an active material for its positive electrode as described above.

Proposed as the developments include one where at least one type of manganese, silver, cobalt and their compounds are mixed with nickel hydroxide to produce a large-capacity nickel electrode, as disclosed in JP, 54-4334, A; one containing a manganese compound in a positive electrode to obtain a battery which is hardly self-discharged and has a low life, as disclosed in JP, 5-121073, A; one containing at least one type of cadmium, calcium, zinc, magnesium, iron, cobalt and manganese in an active material composed of powdered nickel hydroxide, to inhibit swelling of a positive electrode and improve the energy density and the cycle life, as disclosed in JP, 5-21064, A; and one where that not less than 50% of manganese exists in a state where its valence is 3 in nickel hydroxide containing manganese, to improve the active material utilization of nickel hydroxide, as disclosed in JP, 7-335214, A.

Even in the developments disclosed in the above-mentioned publications, a method of effectively suppressing oxygen gas evolution during the charging is not disclosed. Therefore, the pressure in the battery still rises by oxygen gas evolution, so that there are some problems. For example, an electrolyte leaks from the battery, and charge/discharge cycle performance is degraded.

An object of the present invention is to solve the above-mentioned problems in an alkali storage battery such as a nickel-zinc storage battery, a nickel-cadmium storage battery, or a nickel-metal hydride storage battery using nickel hydroxide as a cathode active material for its positive electrode.

Specifically, an object of the present invention is to make it possible to simply suppress, in an alkali storage battery using nickel hydroxide as a cathode active material for its positive electrode, oxygen gas evolution during the charging of the battery.

Another object is to obtain an alkali storage battery having a large battery capacity by increasing the energy density of the battery without enlarging a void inside the battery and increasing the area of its negative electrode such that oxygen gas is absorbed at the negative electrode, as in the conventional example, in order to inhibit the pressure in the battery from rising by oxygen gas evolution during the charging.

Still another object is to obtain an alkali storage battery which is superior in charge/discharge cycle performance.

DISCLOSURE OF INVENTION

An alkali storage battery according to the present invention is an alkali storage battery comprising a positive electrode, a negative electrode and an alkali solution as an electrolyte in a battery can, wherein $\alpha$-nickel hydroxide containing manganese is used as a cathode active material for the positive electrode, and the volume percentage of the cathode active material and an anode active material in a containing portion of the battery can is not less than 75%.

As in the alkali storage battery according to the present invention, when $\alpha$-nickel hydroxide containing manganese is used as the cathode active material for the positive electrode, the difference between an oxygen gas evolution potential and a charging potential at the positive electrode is increased, so that the alkali storage battery can be simply charged to a predetermined potential while suppressing oxygen gas evolution during the charging without decreasing the voltage and the battery capacity in the alkali storage battery.

Therefore, in the alkali storage battery according to the present invention, the necessities of spirally winding an electrode to enlarge a void inside the battery and increasing the area of its negative electrode such that oxygen gas is absorbed at the negative electrode as in the conventional alkali storage battery are eliminated.

It is possible to charge the alkali storage battery to a predetermined potential while suppressing oxygen gas evolution during the charging as described above. Even when the battery is fabricated so as to have an inside out structure in which the volume percentage of the cathode active material and the anode active material in the containing portion of the battery can is not less than 75%, therefore, no leakage of an electrolyte from the battery occurs by the rise in the pressure in the battery, and charge/discharge cycle performance is not degraded. Therefore, the alkali storage battery has a high energy density and a large battery capacity.

In the present invention, the oxygen gas evolution potential means a potential at the time point where charging is performed at an electrochemical equivalent which is 1.5 times as large as that for the cathode active material, and the charging potential means a potential at the time point where charging is performed at an electrochemical equivalent which is 0.5 times as large as that for the cathode active material.

In the alkali storage battery according to the present invention, if the amount of manganese contained in the cathode active material is less, the difference between the oxygen gas evolution potential and the charging potential at the positive electrode is decreased, so that oxygen is easily generated during the charging. On the other hand, if the amount of manganese is too large, the ratio of nickel hydroxide in the cathode active material is decreased, so that the battery capacity is decreased. Therefore, the amount of manganese in the cathode active material is preferably in the range of 8 to 60 mole %, and more preferably in the range of 15 to 40 mole %.

By including manganese in $\alpha$-nickel hydroxide as described above, the alkali storage battery is prevented from being self-discharged, for example, in such a manner that manganese is uniformly contained in $\alpha$-nickel hydroxide, so that it is desirable to uniformly dissolve and precipitate manganese in $\alpha$-nickel hydroxide using nickel sulfate or manganese sulfate.

By thus including manganese in the cathode active material so as, to adjust the difference between the oxygen gas evolution potential and the charging potential at the positive electrode, oxygen is sufficiently suppressed during the charging without decreasing the voltage and the battery capacity in the alkali storage battery. Therefore, the charging potential is preferably 120 to 300 mV, more preferably 120 to 180 mV lower than the oxygen gas evolution potential.

When a potential at the positive electrode at which the charging is stopped is 120 to 300 mV, preferably 120 to 180 mV lower than the oxygen gas evolution potential, oxygen gas evolution is suppressed during the charging, so that no electrolyte leaks from the alkali storage battery, and the alkali storage battery can be sufficiently charged. Further, the voltage and the battery capacity in the alkali storage battery are not decreased.

In the alkali storage battery in the present invention, the anode active material used for the negative electrode is not particularly limited, provided that it is generally used in an alkali storage battery. However, it is preferable that zinc having a low redox potential is used as the anode active material for the negative electrode in order that sufficient battery voltage is obtained even when the difference between the oxygen gas evolution potential and the charging potential at the positive electrode is increased as described above.

BEST MODE FOR CARRYING OUT THE INVENTION

Figure 1:
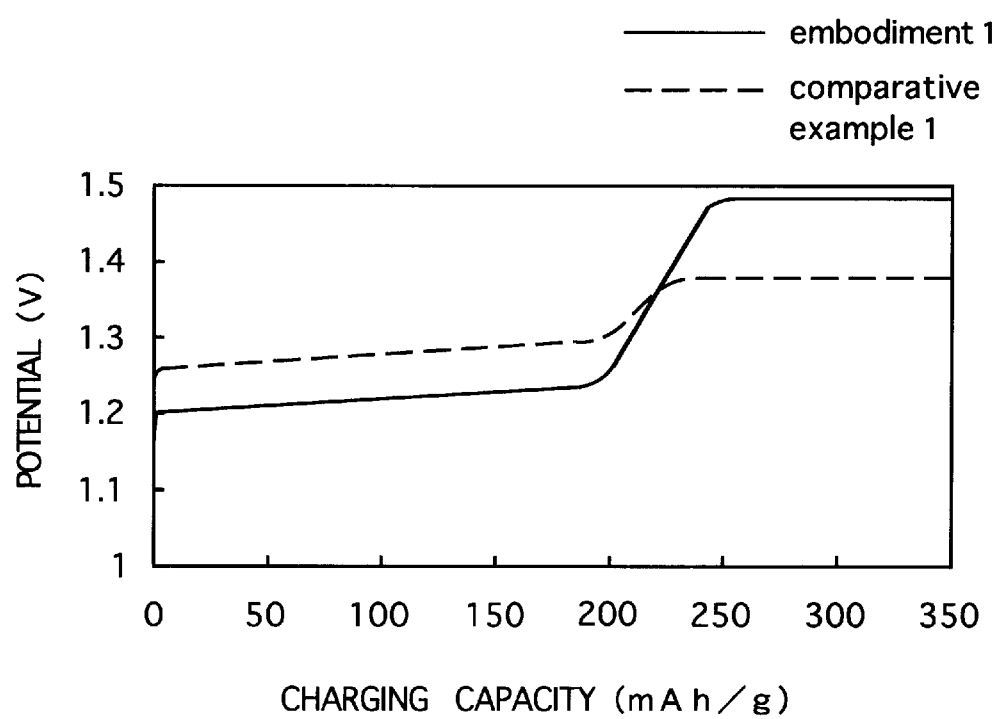
FIG. 1 is a schematic cross-sectional view of an alkali storage battery according to an embodiment of the present invention.

An alkali storage battery according to an embodiment of the present invention and a method of charging will be specifically described, and it will be clarified by taking comparative examples, to show that in the alkali storage battery in the present embodiment, oxygen gas evolution is sufficiently suppressed during the charging, so that the battery capacity can be increased, and superior charge/discharge cycle performance is obtained. The alkali storage battery and the method of charging in the present invention are not particularly limited to those described in the following embodiments, and can be embodied by being suitably changed within a range in which the gist thereof is not changed.

Embodiment 1

In the present embodiment, a solution of nickel sulfate and a solution of manganese sulfate were mixed such that the molar ratio of manganese sulfate to nickel sulfate would be 1:9.

10% ammonia aq. solutions water and a 10% solution of sodium hydroxide aq. solution were added to the mixed solution, and were adjusted such that the pH would be 10.0±0.4 to form a precipitate. The precipitate was filtered, and was then preserved at room temperature in a 20% potassium hydroxide aq. solution for one week, after which the precipitate was cleaned, and was filtered, to obtain a cathode active material containing manganese in $\alpha$-nickel hydroxide.

In the cathode active material thus obtained, the content of manganese was 10 mole %, and the mean particle diameter thereof was 10 $\mu$m.

The cathode active material with, graphite serving as a conductive material, cobalt hydroxide serving as a conductive material, and powdered polytetrafluoroethylene (PTFE) serving as a binder, were kneaded in a weight ratio of 84:8:3:5.

Comparative Example 1

In comparative example 1, for producing a cathode active material, cobalt sulfate was used in place of manganese sulfate in the above-mentioned embodiment 1. A positive electrode agent was obtained in the same manner as that in the embodiment 1 except that the molar ratio of nickel sulfate to cobalt sulfate would be 1:9.

Comparative Example 2

In comparative example 2, for producing a cathode active material, cadmium sulfate was used in place of manganese sulfate in the above-mentioned embodiment 1. A positive electrode agent was obtained in the same manner as that in the embodiment 1 except that the molar ratio of nickel sulfate to cadmium sulfate would be 1:9.

Comparative Example 3

In comparative example 3, for producing a cathode active material, zinc sulfate was used in place of manganese sulfate in the above-mentioned embodiment 1. A positive electrode agent was obtained in the same manner as that in the embodiment 1 except that the molar ratio of nickel sulfate to zinc sulfate would be 1:9.

Comparative Example 4

In comparative example 4, for producing a cathode active material, magnesium sulfate was used in place of manganese sulfate in the above-mentioned embodiment 1. A positive electrode agent was obtained in the same manner as that in the embodiment 1 except that the molar ratio of nickel sulfate to magnesium sulfate would be 1:9.

Comparative Example 5

In comparative example 5, for producing a cathode active material, calcium sulfate was used in place of manganese sulfate in the above-mentioned embodiment 1. A positive electrode agent was obtained in the same manner as that in the embodiment 1 except that the molar ratio of nickel sulfate to calcium sulfate would be 1:9.

Comparative Example 6

In comparative example 6, for producing a cathode active material, aluminum sulfate was used in place of manganese sulfate in the above-mentioned embodiment 1. A positive electrode agent was obtained in the same manner as that in the embodiment 1 except that the molar ratio of nickel sulfate to aluminum sulfate would be 1:9.

With respect to each of the cathode active materials obtained in embodiment 1 and in comparative examples 1 to 6, the crystal structure was analyzed by an X-ray diffraction method (XRD). From the results, the cathode active materials in embodiment 1 and in comparative example 1 had an a-nickel hydroxide structure, while the cathode active materials in the comparative examples 2 to 6 had a B-nickel hydroxide structure.

1 g of each of the positive electrode agents in the embodiment 1 and the of comparative examples 1 to 6 was formed by pressure into the shape of a disk having a diameter of 20 mm, after which a collector was mounted thereon, to fabricate a positive electrode for testing.

A sintering-type cadmium electrode having an excessive capacity as a negative electrode, as compared with the capacity of each of the above-mentioned positive electrodes for testing, was used, so as to fabricate a battery for testing which used an excessive alkali solution for electrolyte. A cadmium electrode charged up to 50% of the capacity was used as a reference electrode.

In measuring an oxygen gas evolution potential V1 and a charging potential V2 at each of the positive electrodes for testing, the testing battery was charged at 30 mA/g for 15 hours. After the charging, it was kept for one hour. Thereafter, the testing battery was then discharged with constant current of 100 mA up to 1.0 V to measure the oxygen gas evolution potential V1 and the charging potential V2 at the positive electrode for testing as well as to find the difference (V1–V2) between the oxygen gas evolution potential and the charging potential, and to further find the number of exchanged electrons related to reaction on the basis of one mole of the nickel atom in the cathode active material. The results are shown in the following Table 1.

TABLE 1

| positive electrode agent | oxygen gas evolution potential V1 (V) | charging potential V2 (V) | V1–V2 (V) | number of exchanged electrons based on Ni atom |
|---|---|---|---|---|
| embodiment 1 | 1.495 | 1.237 | 0.258 | 1.00 |
| comparative example 1 | 1.416 | 1.296 | 0.120 | 0.96 |
| comparative example 2 | 1.428 | 1.305 | 0.123 | 0.93 |
| comparative example 3 | 1.420 | 1.316 | 0.104 | 0.93 |

TABLE 1-continued

| positive electrode agent | oxygen gas evolution potential V1 (V) | charging potential V2 (V) | V1–V2 (V) | number of exchanged electrons based on Ni atom |
|---|---|---|---|---|
| comparative example 4 | 1.408 | 1.346 | 0.062 | 0.95 |
| comparative example 5 | 1.421 | 1.338 | 0.082 | 0.96 |
| comparative example 6 | 1.395 | 1.368 | 0.027 | 0.85 |

As a result, in the battery tested using the positive electrode agent of embodiment 1, the difference between the oxygen gas evolution potential and the charging potential was as large as 0.258 V. On the other hand, in each of the batteries tested using the positive electrode agents of comparative examples 1 to 6, the difference between the oxygen gas evolution potential and the charging potential was smaller than that in the embodiment 1.

The battery for testing using each of the positive electrode agents in the embodiment 1 and the comparative example 1 was charged and discharged as described above in 10 cycles, and the relationship between a potential and a charging capacity in the battery in the 10-th cycle was examined. The results were shown in FIG. 1.

As a result, in the battery tested using the positive electrode agent in the embodiment 1, the rise in the voltage in a portion from the charging capacity of 200 mAh/g to the charging capacity of 250 mAh/g was more rapid, as compared with that in the battery tested using the positive electrode agent in the comparative example 1.

Therefore, in the case of the battery for tested using the positive electrode agent in the embodiment 1, the charging voltage was set such that the charging capacity would be in the range of 200 to 250 mAh/g, so that a large battery capacity was obtained by sufficiently charging the battery while suppressing oxygen gas evolution during the charging.

On the other hand, in the case of the battery tested using the positive electrode agent in the comparative example 1, the voltage gradually increased during the charging, so that it was difficult to obtain a large battery capacity while suppressing oxygen gas evolution during the charging.

Figure 2:
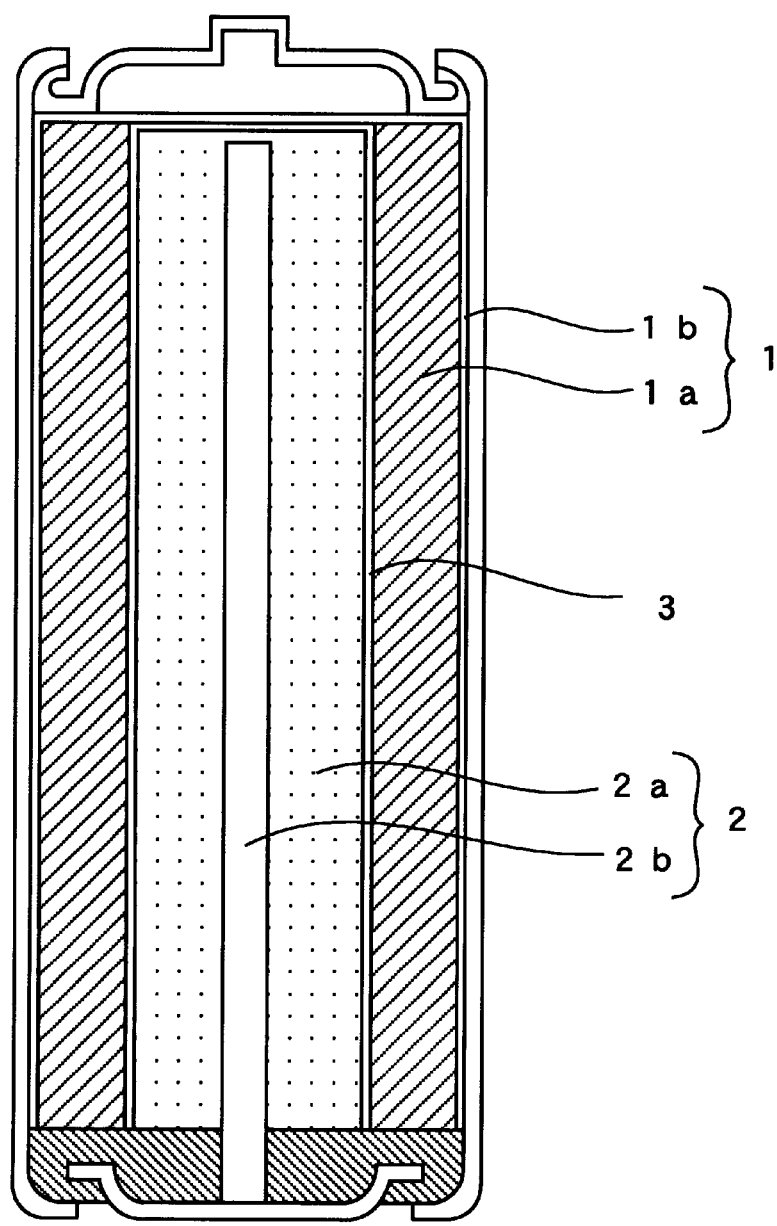
FIG. 2 is a diagram showing the relationship between a potential and a charging capacity in the 10-th cycle in for testing fabricated batteries using positive electrode agents used in an embodiment 2 of the present invention and a comparative example 1.

Then, the positive electrode agent in each of the embodiment 1 and the comparative examples 1 to 6 was used for the positive electrode. A kneaded mixture of zinc oxide having an average particle diameter of 0.4 $\mu$m, zinc having an average particle diameter of 120 $\mu$m, indium hydroxide for suppressing oxygen gas evolution, and polytetrafluoroethylene serving as a binder in a weight ratio of 60:35:3:2 was used as the negative electrode agent at the negative The positive and negative electrodes were fabricated into an alkali storage battery having an inside out structure as shown in FIG. 2.

In fabricating each of the alkali storage batteries using the agents of embodiment 1 and comparative examples 1 to 6, the above-mentioned positive electrode agent 1a was formed in a cylindrical shape and was inserted into a positive electrode can 1b, to construct a positive electrode 1. An alkali solution as an electrolyte was impregnated in a separator 3 obtained by laminating cellophane and a polyolefin nonwoven fabric, and the separator 3 was provided around a hollow portion at the center of the positive electrode 1. The hollow portion of the positive electrode 1 was filled with the above-mentioned negative electrode agent 2a through the separator 3, and a negative electrode collector 2b in the shape of a stick was arranged at its central part to construct a negative electrode 2, thereby fabricating an alkali storage battery having an inside out structure.

Each of the alkali storage batteries according to embodiment 1 and comparative examples 1 to 6 fabricated in the above-mentioned manner was then charged with constant current of 100 mA up to 1.95 V, was preserved at a temperature of 40° C. for one week, and was then discharged with constant current of 100 mA up to 1.0 V to measure a charging capacity C1 and a discharging capacity C2 as well as to find the ratio of the discharging capacity C2 to the charging capacity C1 (C2/C1). Further, 10 alkali storage batteries according to each of embodiment 1 and comparative examples 1 to 6 were charged and discharged, as described above, to find the number of alkali storage batteries from which electrolyte leaks. The results were shown in the following Table 2.

TABLE 2

| battery | charging capacity C1 (mAh) | discharging capacity C2 (mAh) | C2/C1 | number of batteries from which alkali solution leaks |
|---|---|---|---|---|
| embodiment 1 | 1680 | 1630 | 0.97 | 0 |
| comparative example 1 | 1570 | 1380 | 0.87 | 3 |
| comparative example 2 | 1580 | 1410 | 0.89 | 2 |
| comparative example 3 | 1480 | 1270 | 0.85 | 5 |
| comparative example 4 | 1360 | 890 | 0.65 | 9 |
| comparative example 5 | 1460 | 980 | 0.67 | 4 |
| comparative example 6 | 1300 | 570 | 0.47 | 10 |

As a result, in the alkali storage battery of embodiment 1 using the cathode active material containing manganese in α-nickel hydroxide, the ratio of the discharging capacity C2 to the charging capacity Cl (C2/C1) was higher as compared with that in each of the alkali storage batteries of comparative examples 1 to 6, and leakage of the electrolyte such as occurred and in each of the alkali storage batteries in the comparative examples 1 to 6 did not occur. The reason for this was conceivably that when the cathode active material containing manganese in α-nickel hydroxide as in the alkali storage battery of embodiment 1 was used, the difference between the charging potential and the oxygen gas evolution potential was increased, as shown in the foregoing Table 1, so that oxygen gas evolution was suppressed during the charging, nickel hydroxide was prevented from being unstable by being excessively oxidized, and the stability of the positive electrode in a charged state was improved.

Experimental Example 1

In the experimental example, the alkali storage battery in the above-mentioned embodiment 1 was used, and was charged and discharged in the same manner as that in the above-mentioned case except that the charging final voltage was changed as shown in the following Table 3 in charging the battery with constant current of 100 mA. In so doing, the charging capacity C1 and discharging capacity C2 were measured to find the ratio of the discharging capacity to the charging capacity C1 (C2/C1). Further, 10 alkali storage batteries were charged and discharged, as described above, to find the number of batteries from which electrolyte leaks. The results were shown in Table 3.

TABLE 3

| charging final voltage (V) | charging capacity C1 (mAh) | discharging capacity C2 (mAh) | C2/C1 | number of batteries from which alkali solution leaks |
|---|---|---|---|---|
| 2.13 | 1730 | 1620 | 0.93 | 3 |
| 2.07 | 1710 | 1630 | 0.95 | 0 |
| 2.01 | 1690 | 1640 | 0.97 | 0 |
| 1.95 | 1680 | 1630 | 0.97 | 0 |
| 1.83 | 1550 | 1530 | 0.99 | 0 |
| 1.80 | 1420 | 1410 | 0.99 | 0 |

As a result, when the charging final voltage was set to 2.13 V, the charging and discharging efficiency was reduced, and an electrolyte partially leaked. The reason for this was conceivably that when the charging final voltage was set to 2.13 V, the charging potential reached an oxygen gas evolution potential, so that oxygen was generated at the positive electrode.

When the charging final voltage was set to 2.07 V, no electrolyte leaked, while the charging and discharging efficiency was slightly reduced. The reason for this was conceivably that nickel hydroxide at the positive electrode became unstable upon being excessively oxidized because the alkali storage battery was charged to a high potential, and was easily decomposed at the time of preservation.

On the other hand, when the charging final voltage was set to not more than 2.01 V, no electrolyte leaked, and the charging and discharging efficiency was increased. However, the battery capacity was decreased as the charging final voltage was decreased.

In order to increase the charging and discharging efficiency while preventing an electrolyte from leaking as well as to make the decrease in the battery capacity slight, therefore, it was preferable to make the charging final voltage 120 to 300 mV lower than 2.13 V which is an oxygen gas evolution potential. In order to make the decrease in the battery capacity slighter, it was preferable to make the charging final voltage 120 to 180 mV lower than the oxygen gas evolution potential.

Experimental Example 2

In the experimental example, in obtaining a cathode active material, nickel sulfate and manganese sulfate were used, as in the above-mentioned embodiment 1. The mixture ratio of nickel sulfate to manganese sulfate was changed to obtain cathode active materials composed of α-nickel hydroxide containing manganese whose amount was 7 mole %, 8 mole %, 10 mole %, 15 mole %, 25 mole %, 40 mole %, 60 mole %, and 70 mole %.

Positive electrode agents were respectively prepared in the same manner as that in the above-mentioned embodiment 1 using the above-mentioned cathode active materials. Batteries for testing were respectively fabricated in the same manner as that in the above-mentioned case using the positive electrode agents thus prepared, to measure the above-mentioned oxygen gas evolution potential V1 and charging potential V2 for each of the positive electrodes to, find the difference (V1–V2) between the oxygen gas evolution potential and the charging potential, and further to find the number of exchanged electrons related to reaction on the basis of one mole of the nickel atom in the cathode active material and to find the number of exchanged electrons related to reaction on the basis of one mole of the sum of the nickel atom and the manganese atom. The results were shown in the following Table 4.

TABLE 4

| amount of | oxygen gas evolution potential | charging potential | | number of exchanged electrons | |
|---|---|---|---|---|---|
| Mn (mole %) | V1 (V) | V2 (V) | V1-V2 (V) | based on Ni | based on Ni + Mn |
| 7 | 1.436 | 1.278 | 0.158 | 0.95 | 0.88 |
| 8 | 1.478 | 1.258 | 0.220 | 0.97 | 0.89 |
| 10 | 1.495 | 1.237 | 0.258 | 1.00 | 0.90 |
| 15 | 1.498 | 1.235 | 0.263 | 1.05 | 0.89 |
| 25 | 1.498 | 1.233 | 0.265 | 1.06 | 0.79 |
| 40 | 1.498 | 1.231 | 0.267 | 1.18 | 0.70 |
| 60 | 1.496 | 1.228 | 0.268 | 1.35 | 0.54 |
| 70 | 1.458 | 1.226 | 0.232 | 1.25 | 0.38 |

Alkali storage batteries having an inside out structure as shown in FIG. 2 were respectively fabricated in the same manner as that in the above-mentioned embodiment 1 using the above-mentioned cathode active materials containing manganese of varying amounts.

Each of the alkali storage batteries thus fabricated was charged with constant current of 100 mA up to 1.95 V, was preserved at a temperature of 40° C. for one week, and was then discharged with constant current of 100 mA up to 1.0 V, after which the discharging was stopped for one hour. The above-mentioned charging and discharging were considered as one cycle. 20 cycles of charging and discharging were performed, to find a discharging capacity Q1 at the first cycle time and a discharging capacity Q20 at the 20-th cycle time as well as to calculate the percentage of capacity retention at the 20-th cycle time on the basis of the following equation. The results were shown in the following Table 5.

Percentage of capacity retention (%)=(Q20/Q1)×100

TABLE 5

| amount of Mn (mole %) | discharging capacity (mAh) | | percentage of capacity retention at 20-th cycle time (%) |
|---|---|---|---|
| | first cycle time | 20-th cycle time | |
| 7 | 1600 | 980 | 61 |
| 8 | 1630 | 1380 | 85 |
| 10 | 1640 | 1460 | 89 |
| 15 | 1620 | 1550 | 96 |
| 25 | 1580 | 1510 | 96 |
| 40 | 1480 | 1450 | 98 |
| 60 | 1240 | 1200 | 97 |
| 70 | 980 | 950 | 97 |

As apparent from the results shown in the foregoing Table 4 and Table 5, when the amount of manganese in the cathode active material was as low as 7 mole %, the difference between the oxygen gas evolution potential and the charging potential was decreased, so that oxygen was easily generated during the charging, and the percentage of capacity retention at the 20-th cycle time was decreased, resulting in degraded charge/discharge cycle performance. On the other hand, when the amount of manganese in the cathode active material was as large as 70 mole %, the battery capacity was decreased.

In order to suppress oxygen gas evolution during the charging, improve the charge/discharge cycle performance, and further obtain a large battery capacity in the above-mentioned alkali storage battery, therefore, it was desirable that the amount of manganese in the cathode active material was preferably in the range of 8 to 60 mole %, and more preferably in the range of 15 to 60 mole %.

In then charging the alkali storage battery in which the amount of manganese in the cathode active material was 10 mole %, 20 cycles of charging and discharging were performed in the same manner as that in the above-mentioned case except that a charging current was first increased such that the battery was charged at a predetermined voltage of 1.90 V and was gradually decreased, to find a discharging capacity Q1 at the first cycle time and a discharging capacity Q20 at the 20-th cycle time as well as to calculate the percentage of capacity retention at the 20-th cycle time. The results, together with the results in the case where the alkali storage battery was charged at a predetermined charging current of 100 mA as described above, were shown in the following Table 6.

TABLE 6

| amount of Mn (mole %) | charging method | discharging capacity (mAh) | | percentage of capacity retention at 20-th cycle time (%) |
|---|---|---|---|---|
| | | first cycle time | 20-th cycle time | |
| 10 | charging at predetermined voltage | 1350 | 1120 | 83 |
| 10 | charging at predetermined current | 1640 | 1460 | 89 |

As a result, when the alkali storage battery was charged at a predetermined voltage of 1.90 V, the percentage of capacity retention at the 20-th cycle time was lower, as compared with that in the case where the alkali storage battery was charged at a predetermined charging current of 100 mA, resulting in degraded charge/discharge cycle performance. However, it took 15 to 16 hours to charge the battery to 1.90 V at a predetermined charging current of 100 mA, while the battery could be charged in a short time period, i.e., two hours, when it was charged at a predetermined voltage of 1.90 V as described above.

INDUSTRIAL APPLICABILITY

As described in detail above, in an alkali storage battery according to the present invention and a method of charging, α-nickel hydroxide containing manganese is used as a cathode active material for a positive electrode of the alkali storage battery. Therefore, the difference between an oxygen gas evolution potential and a charging potential at the positive electrode is increased, the alkali storage battery is simply charged to a predetermined voltage while suppressing oxygen gas evolution without decreasing a voltage in the alkali storage battery, and the range of a voltage at which charging and discharging can be performed is widened, so that a large battery capacity is obtained, and charge/discharge cycle performance is also improved.

In the alkali storage battery according to the present invention and a method of charging, the battery can be simply charged to a predetermined potential while suppressing oxygen gas evolution as described above. As a result, it is possible to fabricate a battery having an inside out structure to increase the energy density of the battery without enlarging a void inside the battery and increasing the area of its negative electrode such that oxygen gas is absorbed at the negative electrode as in the conventional example.

What is claimed is:

1. An alkali storage battery comprising a positive electrode, a negative electrode and an alkali electrolyte in a battery can, characterized in that α-nickel hydroxide containing manganese is used as a cathode active material for the positive electrode, and the volume percentage of the cathode active material and an anode active material for the negative electrode is not less than 75% in the battery can.

2. The alkali storage battery according to claim 1, characterized in that the structure of the battery has an inside out structure.

3. The alkali storage battery according to claim 1, characterized in that the content of manganese in said cathode active material is in the range of 8 to 60 mole %.

4. The alkali storage battery according to claim 1, characterized in that the content of manganese in said cathode active material is in the range of 15 to 40 mole %.

5. The alkali storage battery according to claim 1, characterized in that a charging potential at said positive electrode is 120 to 300 mV lower than an oxygen gas evolution potential at the positive electrode.

6. The alkali storage battery according to claim 1, characterized in that a charging potential at said positive electrode is 120 to 180 mV lower than an oxygen gas evolution potential at the positive electrode.

7. The alkali storage battery according to claim 1, characterized in that zinc is used as the anode active material for the negative electrode.

8. A charging method for an alkali storage battery, characterized in that in charging an alkali storage battery using α-nickel hydroxide containing manganese as a cathode active material for its positive electrode, the charging is stopped at a charging potential lower than an oxygen gas evolution potential at the positive electrode.

9. The charging method for the alkali storage battery according to claim 8, characterized in that a charging potential at the positive electrode at which the charging is stopped is 120 to 300 mV lower than the oxygen gas evolution potential at the positive.

10. The charging method for the alkali storage battery according to claim 8, characterized in that a charging potential at the positive electrode at which the charging is stopped is 120 to 180 mV lower than the oxygen gas evolution potential at the positive electrode.

11. The charging method for the alkali storage battery according to claim 8, characterized in that the content of manganese in said cathode active material is in the range of 8 to 60 mole %.

12. The charging method for the alkali storage battery according to claim 8, characterized in that the content of manganese in said cathode active material is in the range of 15 to 40 mole %.

13. The charging method for the alkali storage battery according to claim 8, characterized in that the battery is charged at a predetermined current to a charging potential lower than the oxygen gas evolution potential at the positive electrode.

14. The charging method for the alkali storage battery according to claim 8, characterized in that the value of a current at which the battery is charged to a predetermined voltage is changed, to charge the battery to a charging potential lower than the oxygen gas evolution potential at the positive electrode.

* * * * *